US012801565B2

(12) United States Patent
Jana et al.

(10) Patent No.: US 12,801,565 B2
(45) Date of Patent: Nov. 17, 2026

(54) APPENDABLE DATA ARCHIVAL

(71) Applicant: Rubrik, Inc., Palo Alto, CA (US)

(72) Inventors: Sayantan Jana, Palo Alto, CA (US); Harshadrai Gajendrakumar Parekh, Palo Alto, CA (US); Harmandeep Singh, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 19/005,877

(22) Filed: Dec. 30, 2024

(65) Prior Publication Data

US 2026/0187029 A1 Jul. 2, 2026

(51) Int. Cl.
*G06F 16/11* (2019.01)
*G06F 16/18* (2019.01)

(52) U.S. Cl.
CPC ........ *G06F 16/113* (2019.01); *G06F 16/1873* (2019.01)

(58) Field of Classification Search
CPC ........................... G06F 16/113; G06F 16/1873
See application file for complete search history.

(56) References Cited

U.S. PATENT DOCUMENTS

| | | | | |
|---|---|---|---|---|
| 2010/0257451 | A1* | 10/2010 | Halevi | H04L 67/02 709/248 |
| 2012/0226776 | A1* | 9/2012 | Keebler | G06F 16/273 709/217 |
| 2018/0225176 | A1* | 8/2018 | Kim | G06F 11/1448 |
| 2019/0235937 | A1* | 8/2019 | Lim | G06F 9/546 |
| 2021/0042263 | A1* | 2/2021 | Zdornov | G06F 11/3466 |
| 2023/0077938 | A1* | 3/2023 | Yarlagadda | G06F 11/1451 707/662 |
| 2025/0342519 | A1* | 11/2025 | Cheng | G06Q 30/0239 |

* cited by examiner

*Primary Examiner* — Loc Tran
(74) *Attorney, Agent, or Firm* — Holland & Hart LLP

(57) ABSTRACT

Methods, systems, and devices for data management are described. Versioned metadata associated with a computing object may be stored in nonvolatile memory. The computing object may be represented as a portioned group that includes multiple portions of the computing object. The versioned metadata may be stored in a first metadata chain for the portioned group and respective metadata chains for the multiple portions. The versioned metadata may be transferred to an archival storage system, which may involve writing serialized metadata in the first metadata chain and the respective metadata chains to a local file one at a time. The serialized metadata for a metadata chain may be removed from volatile memory before all the versioned metadata has been loaded into the volatile memory. The local file may be written to the archival storage system after all the versioned metadata has been written to the local file.

20 Claims, 8 Drawing Sheets

APPENDABLE DATA ARCHIVAL

FIELD OF TECHNOLOGY

The present disclosure relates generally to data management, including techniques for appendable data archival.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
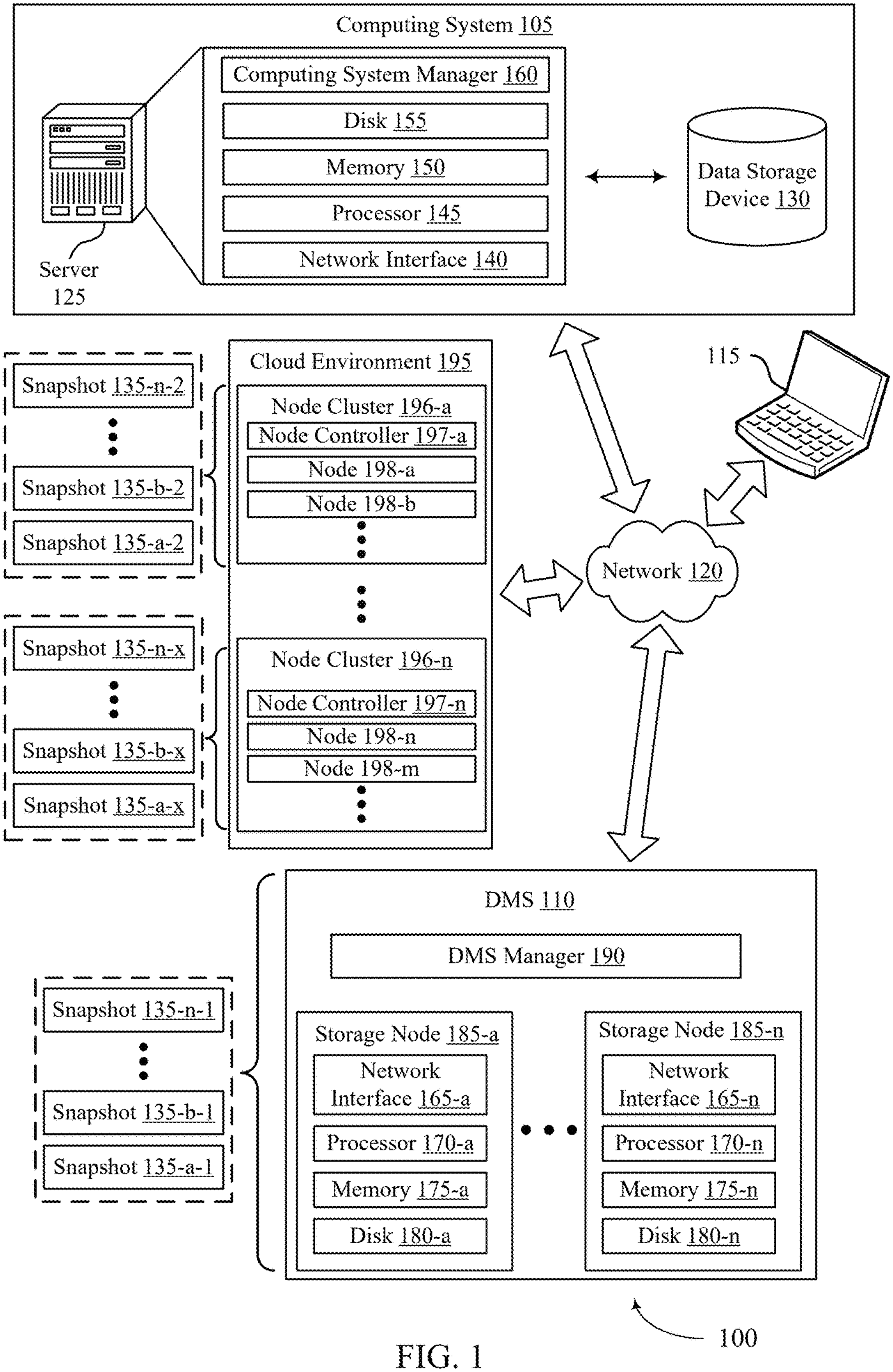
FIG. 1 illustrates an example of a computing environment that supports appendable data archival in accordance with aspects of the present disclosure.

A data management system may manage user data using sharded groups to represent respective computing objects. The sharded groups may be partitioned into shards representing respective portions of the respective computing objects. Each shard may be associated with a respective differential group that captures changes in data (e.g., metadata) of the shard relative to source data—e.g., over a data retention period. These sharded structures may support the efficient (e.g., low-latency, reduced processing complexity, etc.) retrieval of data from the data management system. The data management system may include primary storage systems, secondary storage systems, and archival storage systems. Primary and secondary storage systems may employ data structures that support the management of the sharded structures and, thus, the efficient retrieval of data. Archival storage systems may employ different data structures that support cost-efficient storage of data but less efficient data retrieval than a primary or secondary storage system.

As one option for improving the data retrieval efficiency of an archival storage system, a primary or secondary storage system may transfer user data to an archival storage system along with metadata (e.g., associated with the user data, associated with managing the user data, associated with the sharded structures) captured or generated at a primary or secondary storage system. The process for writing metadata for a computing object to an archival storage system may involve loading a complete serialized image of the metadata into memory before writing the complete serialized image to the archival storage system.

However, serializing and loading a complete serialized image of metadata into memory before and while the serialized image of metadata is written to an archival storage system may cause out-of-memory failures, high CPU usage, high API latency, or any combination thereof. Thus, implementations (e.g., methods, systems, apparatuses, techniques, configurations, components) that support archiving significant amounts of metadata for computing objects with reduced strain on computing resources (e.g., memory resources) may be desired.

To archive significant amounts of metadata for computing objects with reduced strain on computing resources, metadata for portions of a sharded group (e.g., the sharded group, the differential groups, etc.) may be individually and serially written to a temporary local file, and the completed temporary local file may be written to an archival storage system. For example, for the sharded group, first metadata may be serialized, the serialized first metadata may be loaded into memory and written to a temporary local file. Next, for a first differential group, second metadata may be serialized, loaded into memory, and written (e.g., in a stream of after being fully loaded into memory) to the temporary local file in an append mode and flushed from memory. Next, for a second differential group, third metadata may similarly be serialized, loaded, and written to the temporary local file and flushed, and so on. Thus, an amount of metadata stored in memory may be limited to the metadata for the sharded group and the metadata for the differential group being currently processed.

FIG. 1 illustrates an example of a computing environment 100 that supports appendable data archival in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructureas-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

A DMS may use primary and secondary storage systems as well as archival storage to support managing (e.g., backing up, duplicating, live mounting, hydration, restoring, etc.) data for a customer.

Primary and secondary storage systems may be used to support data management services, such as backup, duplication, live mounting, hydration, restoration. The primary and secondary storage system (which may include DMS edge clusters, DMS non-edge clusters, etc.) may employ complex data structures that facilitate the efficient retrieval (e.g., by a customer) of data (e.g., with low latency, with reduced operations, etc.) from the primary and second storage systems. In some examples, a computing object may be represented at a primary or secondary storage system as a sharded group, where a size of the sharded group may be based on a size of the computing object. For example, a computing object, such as a virtual machine, having a 2 TB (virtual) disk may be represented as a 2 TB sharded group. A sharded group may be further partitioned into "shards" of a predetermined shard size (e.g., 512 GB).

The complex data structures at the primary and secondary storage systems may include metadata for the managed data as well as metadata for managing the managed data (e.g., creation dates, expiration dates, etc.). Snapshots of the metadata may be taken to capture the metadata at particular points-in-time—e.g., corresponding to snapshots of the computing object. In some examples, the snapshots are differential snapshots that capture changes in the metadata relative to a source metadata. In some examples, the snapshots may be taken in accordance with the sharding of the sharded group such that portions of the snapshots are distributed across the shards. For example, the shards may be allocated to respective differential groups (which may be referred to as "DiffGroups") that keep track of changes to metadata within a respective shard. In some examples, the differential groups include a chain of contents (which may be referred to a "blobs"), where the contents stored across the differential groups at a particular point may correspond to a portion of a snapshot of the metadata for the computing object.

The metadata in the complex data structures may include metadata for the sharded group, which may include information about the shards—e.g., a location of the shards, the differential groups associated with the shards, etc. The metadata in the complex data structures may also include metadata for the shards—e.g., metadata for a differential group, metadata for blobs in the different group, metadata for the managed data associated with the shard, etc.

Archival storage systems may also be used to support data management services, such as backup, duplication, live mounting, hydration, restoration. In some examples, archival storage systems support these data management services by transferring data (e.g., managed data) to a primary or secondary storage system that directly provides the data management service. Archival storage systems may provide a more cost-efficient storage of data than primary and secondary storage systems. However, the retrieval of data from an archival storage system may be less efficient than the retrieval of data from a primary or secondary storage system. For example, archival storage systems (such as a cloud storage, e.g., Amazon AWS, Google Cloud, etc.) may support less-complex database structures that are associated with higher latency or more intensive data retrieval than primary and secondary storage systems. Thus, in some examples, archival storage systems may be used to store certain types of data (e.g., older data, data that is less likely to be accessed, etc.).

To enable managed data to be retrieved from an archival storage system with increased efficiency (e.g., with lower latency, with reduced processing complexity), the metadata related to managing the managed data at the primary or secondary storage systems (e.g., metadata associated with the sharded group, metadata associated with the shards, etc.) may be stored at the archival storage system with the managed data.

Storing the metadata of the computing object in the archival storage system may include first serializing (e.g., using JSON4's serialization format) the metadata for the full computing object (e.g., for the sharded group and for each shard) and loading the serialized metadata into memory. An example JSON representation of the metadata for the full computing object may be as follows:

```
ShardedChainBlobStoreGroupMetadataSerializable: {
  ShardedGroup: {
    . . .
  }
  DiffGroups: {
    DiffGroup1: {
      . . .
    },
    DiffGroup2: {
      . . .
    },
    .
    .
    DiffGroupN: {
      . . .
    }
  }
}
```

And then, after the data is fully loaded into memory, writing the serialized metadata to a single file at the archival storage system in "one shot" (e.g., as part of a single process). The file may then be stored at the archival storage system. This full loading and then writing process may be used (e.g., rather than a streaming process that involves writing the serialized metadata to a file while it is being loaded) to ensure the serialized metadata is not corrupted during the writing process. JSON data has a structured, though extensible format (e.g., supporting the representation of an unknown quantity of an object, nesting, etc.) and, thus, writing the contents of JSON data to a file (in a streaming process) prior to having full knowledge of the entire data structure may damage the structural integrity of the JSON data—e.g., may result in unmatched braces, improper nesting for JSON objects and arrays, etc. Also, some archival storage systems may not support streaming writes that involve appending a file due to protocol limitations or requirements for atomic operations. Such archival storage system may not be capable of changing an existing file (e.g., using appends) once it has been written to the archival storage system.

In some examples, the process for fully serializing and loading metadata for a computing object exceeds a memory limit of a software layer of a storage system (e.g., a primary or secondary storage system) being used to process the metadata. For example, the software layer may be limited to 2 GB of RAM. As such, for a large computing object, the process for fully serializing and loading metadata may cause the "archival" service that supports storing metadata in an archival storage system to crash—e.g., due to out-of-memory events. In some examples, the archival service crash affects processes for other managed computing objects. The archival service crash may also affect other services supported by the software layer, such as backup, rehydration, duplication, etc. In some examples, storage systems having less RAM and smaller shard sizes are more susceptible to out-of-memory events caused by archiving metadata for a computing object.

For example, a storage system (e.g., a primary or secondary storage system) may be used to back up a 30 TB computing object in accordance with a service level agreement to back up the computing object daily and to retain data for one month. The storage system may represent the 30 TB computing object as a sharded group. The storage system may be further configured to process the computing object with a shard size of 64 GBs and, thus, may have 469 shards and 469 differential groups. The storage system may store metadata for the sharded group and for each differential group. To comply with the service level agreement, the storage system may store up to 30 blobs for the sharded group—e.g., to support one month of restoration. In some examples, the storage system may further store up to 90 blobs for each differential group—e.g., to support the one month of restoration. For example, the storage system may store up to 90 blobs when consolidation techniques are not used (e.g., to avoid using computing resources, if not supported by the storage system, etc.). When consolidation techniques are not used, the storage system may form a blob chain for a differential group until a length of the chain reaches sixty (60) blobs, at which point, the storage system may form a new blob chain. Once the length of the new blob chain reaches thirty (30) blobs, the storage system may delete the old blob chain. Thus, collectively, the storage system may store over 40,000 blobs for the 30 TB computing object. At such quantities, a size of the blobs may themselves exceed a capacity (or an available capacity) of memory that is allocated to the archival service.

In addition to the size of the blobs, a text buffer used to support the serialization of the metadata in the blobs may use a similar amount of memory resources as the bobs. Moreover, a latency associated with the serialization and deserialization of the metadata in the blobs may be excessive—e.g., with deserialization alone constituting up to 75% of total runtime for an application programming interface (API) call. Furthermore, the serialization and deserialization operations of the metadata in the blobs may be associated with high CPU usage of the serialization and deserialization operations, which may impact the performance of other system operations.

In sum, a process for writing metadata for a computing object to an archival storage system that involves loading a complete serialized image of the metadata into memory before and while the serialized image of metadata is written to an archival storage system may suffer from out-of-memory failures, high CPU usage, high API latency, or any combination thereof—e.g., especially for computing objects having large amounts of metadata, such as large computing objects, or computing objects that include a large quantity of sub-objects. Thus, implementations (e.g., methods, systems, apparatuses, techniques, configurations, components) that support archiving significant amounts of metadata for computing objects with reduced strain on computing resources (e.g., memory resources) may be desired.

To archive significant amounts of metadata for computing objects with reduced strain on computing resources, metadata for portions of a sharded group (e.g., the sharded group, the differential groups, etc.) may be individually and serially written to a temporary local file, and the completed temporary local file may be written to an archival storage system. For example, for the sharded group, first metadata may be serialized, the serialized first metadata may be loaded into memory and written to a temporary local file. Next, for a first differential group, second metadata may be serialized, loaded into memory, and written (e.g., in a stream of after being fully loaded into memory) to the temporary local file in an append mode and flushed from memory. Next, for a second differential group, third metadata may similarly be serialized, loaded, and written to the temporary local file and flushed, and so on. Thus, an amount of metadata stored in memory may be limited to the metadata for the sharded group and the metadata for the differential group being currently processed.

In some examples, the DMS 110 (e.g., via a primary or secondary storage system) may store, in nonvolatile memory (e.g., a hard disk, a solid state disk, etc.), one or more sets of versioned metadata for one or more computing objects, including a set of metadata for a computing object. The set of versioned metadata may be used to support efficient access of data stored in the DMS 110 (e.g., for data retrieval, data analysis, etc.). The computing object may be represented in the DMS as a portioned group (which may be referred to as a "sharded group") that includes multiple portions (which may be referred to as "shards") of the computing object. A first portion of the versioned metadata may be stored in a first metadata chain (which may include a chain of blobs) for the portioned group that stores metadata associated with the portioned group (e.g., shard locations, shard sizes, differential group associations) and tracks metadata changes associated with the portioned group. Additional portions of the versioned metadata may also be stored in respective metadata chains for the portions that stores metadata associated with a respective group (e.g., metadata for user data in the shard, metadata associated with tracking changes to the user metadata, etc.) and tracks metadata changes associated with the respective group.

The DMS 110 (e.g., via the primary or secondary storage system) may transfer the versioned metadata for the computing object to an archival storage system (e.g., to increase an available capacity at the primary or secondary storage system). Transferring the versioned metadata may include separately loading the serialized metadata in the metadata chains for the computing object into volatile memory (e.g., RAM) and separately writing the serialized metadata in the metadata chains to a local file—e.g., the DMS 110 may write serialized metadata for respective metadata chains to the local file one at a time (in append mode). Additionally, the DMS 110 may remove, from volatile memory, serialized metadata for respective metadata chains that has been written to the local file. The removed serialized metadata for the respective metadata chains may be removed before serialized metadata for other metadata chains is written to the local file. After completing the local file (e.g., after the serialized metadata for each metadata chain is written to the local file), the local file may be copied to the archival storage system.

By separately loading portions of the serialized metadata into the volatile memory and removing the portions of the serialized metadata from the volatile memory after they are written to the local file, a utilization of the volatile memory at the DMS 110 may be maintained below a threshold amount during an operation for archiving the metadata for a computing object. Additionally, separately loading portions of the serialized metadata into the volatile memory may enable serialization operations to be distributed across the archiving operation, which may distribute the processing load on the DMS 110 and avoid processing utilization peaks that may affect other services provided by the DMS 110.

Figure 2:
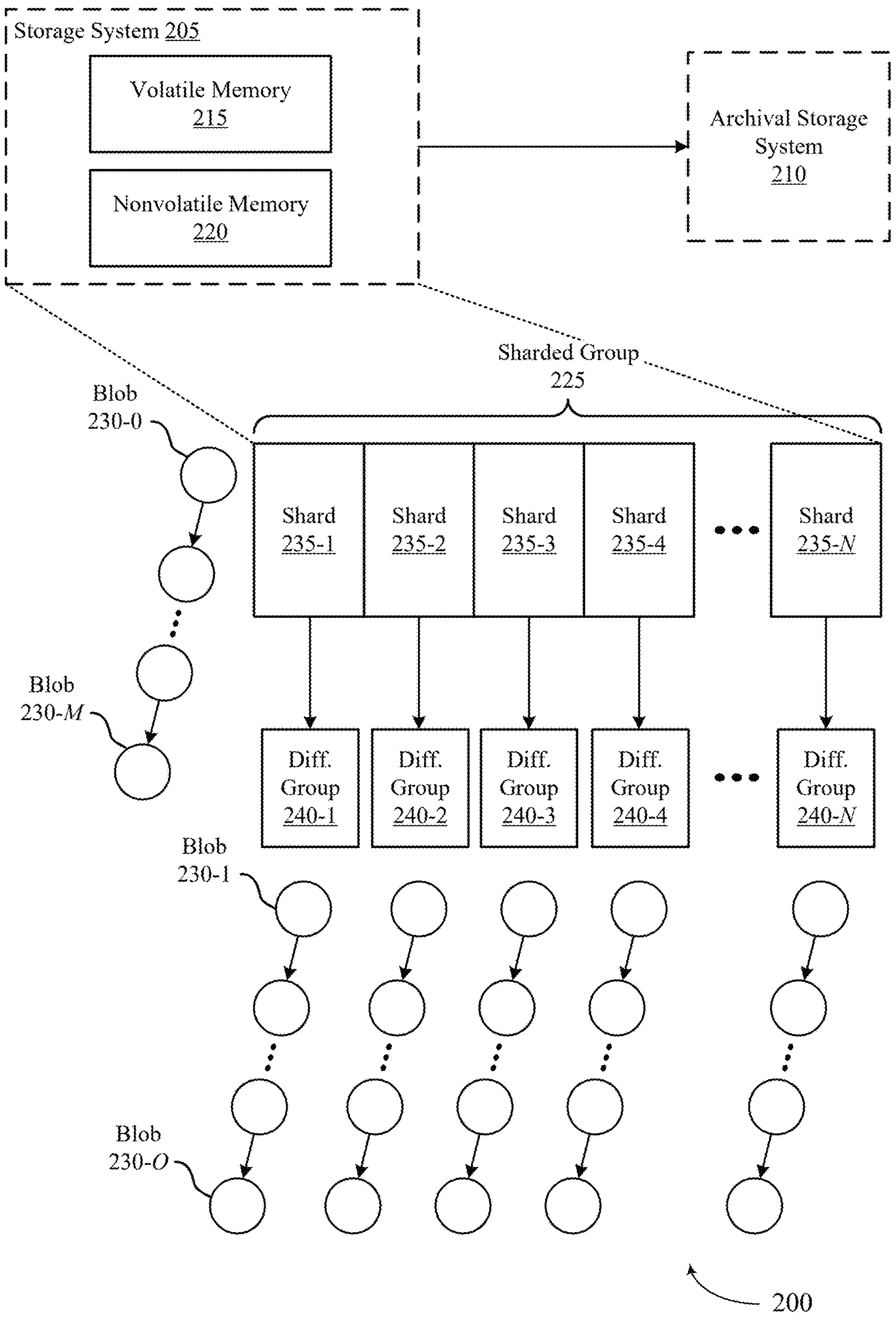
FIG. 2 shows an example of a subsystem that supports appendable data archival in accordance with aspects of the present disclosure.

FIG. 2 shows an example of a subsystem that supports appendable data archival in accordance with examples as disclosed herein.

The subsystem 200 may include a storage system 205 and an archival storage system 205. The storage system 205 and the archival storage system 205 may be components of a DMS. The storage system 205 may be a primary storage system or a secondary storage system, as described herein. In some examples, the storage system 205 may be an edge cluster or a non-edge cluster that supports the operation of the DMS The archival storage system 205 may be an archival storage system, as described herein.

The storage system 205 may include a volatile memory 215 and a nonvolatile memory 220. The storage system 205 may use the volatile memory 215 for short-term storage of information and the nonvolatile memory for long-term storage of information. In some examples, the volatile memory 215 is a random-access memory, and the nonvolatile memory is a storage memory (e.g., a hard drive disk, a solid state disk, etc.). As described herein, the storage system 205 may be used to manage (backup, restore, duplicate, hydrate, live-mount, etc.) data for one or more computing objects.

The storage system 205 may represent a computing object as a sharded group 225 that is partitioned into multiple shards (e.g., the first shard 235-1 to the Nth shard 235-N), where each shard may be associated with a differential group (e.g., the first differential group 240-1 to the Nth differential group 240-N).

In some examples, the storage system 205 monitors changes to the data (including metadata) associated with the sharded group 225. For example, each differential group may monitor changes for metadata within a respective portion of the computing object. Additionally, or alternatively, the storage system 205 may monitor changes to metadata associated with managing the data of the computing object. For example, the storage system 205 may generate metadata related to the shard-level representation of the computing object—e.g., a location of the shards within the sharded group, a mapping between shards and differential groups, etc. Additionally, or alternatively, the storage system 205 may generate metadata related to the blob-level representation of the portions of the computing object—e.g., blob creation times, blob expiration times, etc. In some examples, the metadata changes monitored for the sharded group may be stored in a first blob chain (e.g., the zeroth blob 230-0 to the Mth blob 230-M) and the metadata changes monitored for the differential groups may be stored in respective blob chains (e.g., the metadata changes for the first differential group 240-1 may be stored within the first blob 230-1 to the Oth blob 230-O.

As described herein, the storage system 205 may be configured to store data for a managed computing object in the archival storage system 205—e.g., to free space within the storage system 205, for more cost-effective storage, etc. As further described herein, the storage system 205 may be configured to store (data-level, data management-level, or both) metadata along with the stored data—e.g., to enable more efficient access of the data stored in the archival storage system 205. And, as additionally described herein, the storage system 205 may be configured to write (in an append mode) serialized metadata to a local file on a per-differential group basis before writing the completed local file to the archival storage system 205.

Figure 3:
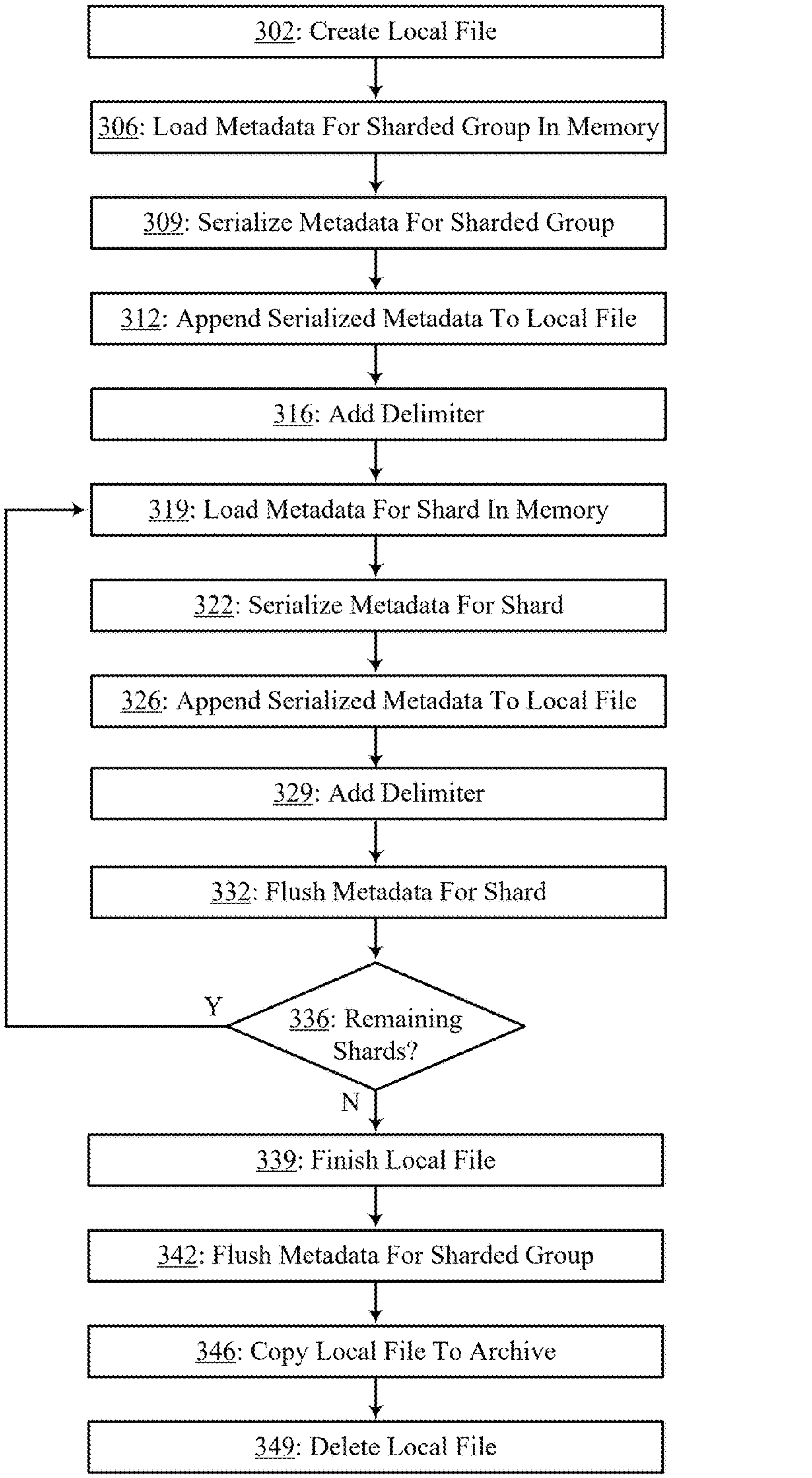
FIG. 3 shows an example of a set of operations for appendable data archival in accordance with aspects of the present disclosure.

FIG. 3 shows an example of a set of operations for appendable data archival in accordance with examples as disclosed herein.

The flowchart 300 may be performed by a storage system described herein. In some examples, the flowchart 300 shows an example set of operations performed to support appendable data archival. For example, the flowchart 300 may include operations that enable a storage system to store metadata in an archival storage system with a reduced strain on memory resources at the storage system.

At 302, a local file may be created at the storage system (e.g., in response to a procedure for archiving data being initiated). In some examples, the local file may be stored in a nonvolatile memory. In other examples, the local file may be stored in a volatile memory—e.g., that is different than the volatile memory used to process metadata for a sharded group. In some examples, a header is added to the local file—e.g., that provides information about the local file, indicates a starting point of metadata, etc.

At 306, metadata may be loaded into a volatile memory of the storage system for a sharded group that represents a computing object managed by the storage system.

At 309, the metadata for the sharded group may be serialized—e.g., before, in parallel with, or after the metadata is loaded into the volatile memory. In some examples, the metadata may be serialized in accordance with a JSON format. In other examples, the metadata may be serialized in accordance with non-JSON format.

At 312, the serialized metadata for the sharded group may be appended to the local file—e.g., the serialized metadata may be written at the end of the local file after the header.

At 316, a delimiter may be added to the local file after the appended serialized metadata for the sharded group—e.g., to signify the end of the serialized metadata for the sharded group and the beginning of a next set of serialized metadata. In some examples, the delimiter may be selected such that the delimiter will not match any metadata character in compressed form, either absolutely or as a prefix. After the delimiter is added, the structure of the local file may be as follows:

```
**Header**
ShardedGroup: {
  . . .
}###
```

where Header may represent a custom header and the ### value may correspond to the delimiter. In some examples, the local file may be closed after the delimiter is added.

At 319, metadata may be loaded into the volatile memory for a shard of the sharded group—e.g., the metadata represented by a differential group associated with the shard may be loaded.

At 322, the metadata for the shard may be serialized—e.g., before, in parallel with, or after the metadata is loaded into the volatile memory. In some examples, the metadata may be serialized in accordance with a JSON format. In other examples, the metadata may be serialized in accordance with non-JSON format. In some examples, portions of the metadata may be serialized in accordance with the JSON format while other portions of the metadata may be serialized in accordance with the non-JSON format.

At 326, the serialized metadata for the shard may be appended to the local file—e.g., the serialized metadata may be written at the end of the local file after the delimiter for the sharded group. In some examples, the local file may be opened—e.g., if the local file was closed after adding the delimiter associated with the sharded group.

At 329, a delimiter may be added to the local file after the appended serialized metadata for the shard—e.g., to signify the end of the serialized metadata for the shard and the beginning of a next set of serialized metadata. After the delimiter is added, the structure of the local file may be as follows:

```
**Header**
ShardedGroup: {
  . . .
}###
Diffgroup1: {
  . . .
}###
```

In some examples, the local file may be closed after the delimiter is added.

At 332, the metadata for the shard may be removed (or "flushed") from the volatile memory—e.g., to increase an available capacity of the metadata. In some examples, the metadata for the sharded group may be maintained in the volatile memory (e.g., until the local file is completed) as the metadata for the sharded group may store information that is used to identify the metadata for the shards (e.g., shard location, shard size, etc.).

At 336, a determination of whether there are any remaining shards for which metadata has not yet been serialized and written to the local file may be made. If there are remaining shards, the next shard may be processed as similarly described with reference to the operations described in 319 through 332. Otherwise, operations for finishing the local file may be performed. After the last shard is processed, the structure of the local file may be as follows:

```
**Header**
ShardedGroup: {
  . . .
}###
DiffGroup1: {
  . . .
}###
. . .
DiffGroupN: {
  . . .
}###
```

At 339, the local file may be finished. In some examples, finishing the local file includes appending a footer to the local file after the last delimiter for the last shard. In some examples, the local file may be closed once it is finished. After the local file is finished, the structure of the local file may be as follows:

```
**Header**
ShardedGroup: {
  . . .
}###
DiffGroup1: {
  . . .
}###
. . .
DiffGroupN: {
  . . .
}###
**Footer**
```

where Footer may represent a custom footer.

At 342, the metadata for the sharded group may be removed from the volatile memory.

At 346, the local file may be copied to the archival storage system. The local file may be copied to the archival storage system in "one-shot"—e.g., in a single, atomic write operation whose execution involves opening, writing a full data set to, and closing a target file at the archival storage system. In some examples, an archival storage system may not support appends to a target file and may limit write operations to the archival storage system atomic write operations. In some examples, (e.g., to conserve memory resources) the computing object may load portions of the local file into volatile memory and remove portions of the local file from volatile memory as they are written to the archival storage system while maintaining compliance with the archival storage systems atomic write characteristics (e.g., while still writing the local file to the archival storage system in one-shot).

At 349, the local file may be deleted from the nonvolatile memory, the volatile memory, or both—upon confirmation the local file was successfully written to the archival storage system. In some examples, if there is a failure writing metadata to the local file during this procedure, the local file may be deleted and this procedure may be restarted at the beginning. In some examples, a task at the storage system may be created to periodically remove such local files at the storage system (e.g., rather than deleting the local files immediately after copying to the archive).

As described herein, individually loading and writing metadata for each shard to the local file may reduce the likelihood of memory resource utilization failures, such as out-of-memory conditions, and reduce a processing burden—e.g., by discretizing serialization. Although a process that involves individually loading and writing metadata for each shard to the local file is described, alternative procedures may also be used, such as procedures that involve loading metadata for multiple shards into volatile memory and serially writing the serialized metadata to the local file. In some examples, the quantity of shards for which metadata may be loaded into the volatile memory may be based on an available capacity of the volatile memory (e.g., the quantity may be selected to ensure that a threshold amount of volatile memory remains accessible), an available capacity of the processing resources (e.g., the quantity may be selected to ensure that the processing utilization remains below a threshold or so that a threshold quantity of cores remain accessible), and the like.

In some examples, when there is a change for serialized fields in metadata that affects multiple blobs (e.g., large map fields), rather than making the change in each of the blobs, a single (e.g., string-based) structure may be used to track the changes to the serialized fields for the multiple blobs. In some examples, memory caching may be used for such fields, and setter and getter methods for such fields may be configured to modify and fetch values for such fields from the memory cache. In some examples, a string for such a field that it is read from the database may be dropped and then reserialized and persisted in the database based on changes to the single structure made during a transaction. The single structure may be stored in RAM (e.g., during this procedure), in nonvolatile memory, or both. In some examples, using a single structure reduces latency and processing load by avoiding the serialization and deserialization of the metadata for each affected blob to change the affected fields. Thus, a single serialization and deserialization of the single structure may be performed to capture the metadata changes.

In some examples, custom serialization methods may be used for certain of the data structures (e.g., small or simple data structure) used to represent the metadata of a computing object. For example, nested identifiers (e.g., that include a blob ID, a composite ID, a group ID, etc.) may be stored using a string-based format (e.g., that uses slash delimiters between different IDs, such as "group ID/composite ID/blob ID") rather than in a structured serialized format (using matching braces and indenting). This may allow the serialization process to avoid string manipulation and parsing operations associated with serialization for the certain data structures.

Reading the stored metadata from the archival storage location (e.g., during an archival rehydration) may follow a similar path as the write procedure. For example, during a read operation, a storage system may identify and read the metadata for the sharded group using the sharded group key and the delimiter. The storage system may further identify and read the metadata for the shards/differential groups using the differential group key and the delimiters. In some examples, the storage system may be configured to distinguish between metadata files that have been stored using JSON encoding from metadata files that have been stored as described in this procedure as the metadata files may share an extension (e.g., .gz). In some examples, metadata files that have been stored using this procedure may be given a file name, file prefix, file suffix, or any combination thereof, that indicates that the metadata files were stored using this procedure rather than a JSON procedure. In some examples, to ensure the storage system is capable of processing metadata files stored in accordance with this procedure, accessing the stored metadata file (e.g., for archival rehydration) may be limited to storage systems that are on the same or a higher software version than the storage system that stored the metadata file. In some examples, an indication of the software version of the storage system that stored the metadata file may be stored in a header or footer of the stored metadata file.

Aspects of the flowchart 300 may be implemented by a controller, among other components. Additionally, or alternatively, aspects of the flowchart 300 may be implemented as instructions stored in memory (e.g., firmware stored in a memory coupled with a controller). For example, the instructions, when executed by a controller, may cause the controller to perform the operations of the flowchart 300.

One or more of the operations described in the flowchart 300 may be performed earlier or later, omitted, replaced, supplemented, or combined with another operation. Also, additional operations described herein may replace, supplement or be combined with one or more of the operations described in the flowchart 300.

Figure 4:
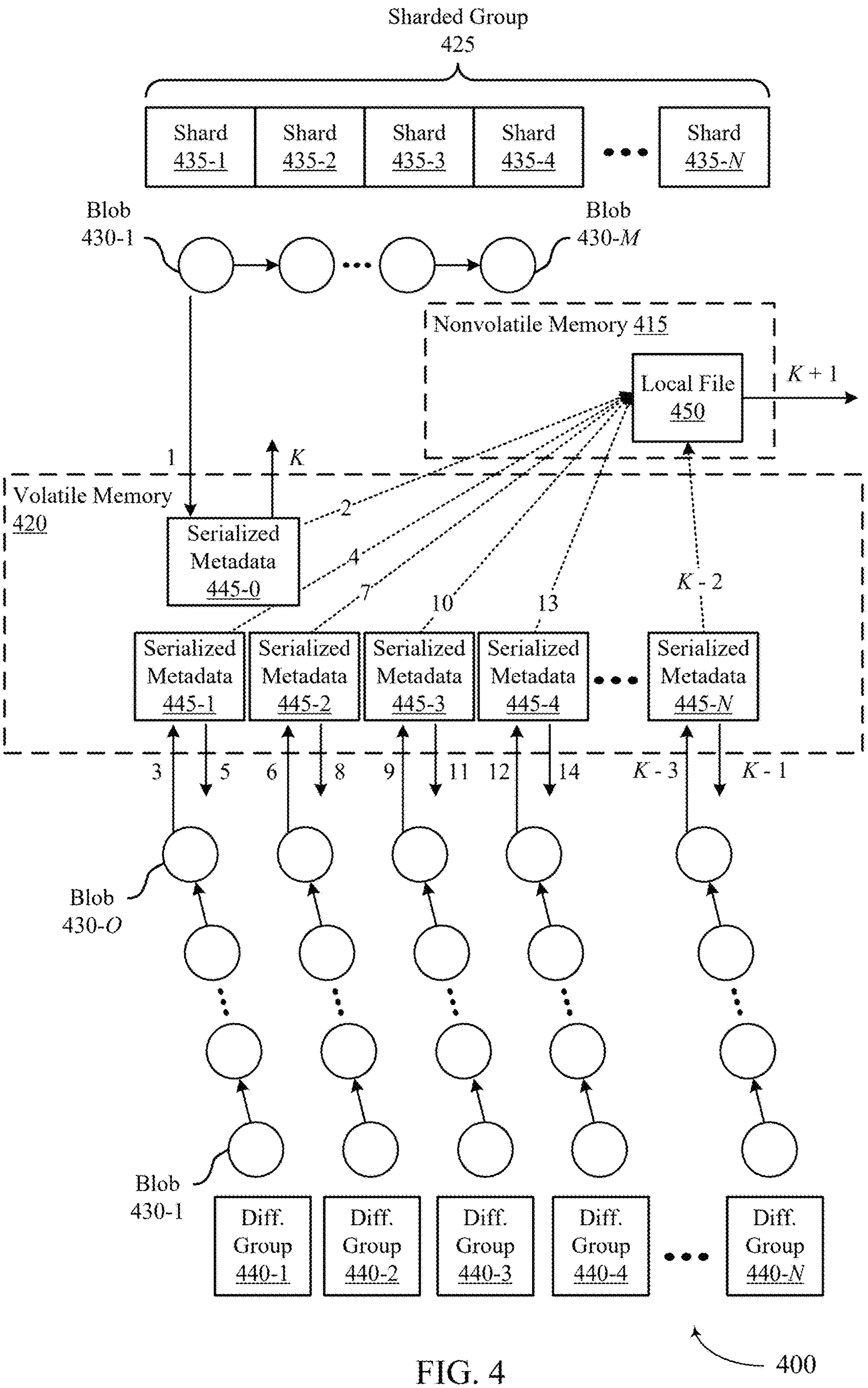
FIG. 4 shows an example of a diagram for appendable data archival in accordance with aspects of the present disclosure.

FIG. 4 shows an example of a diagram for appendable data archival in accordance with examples as disclosed herein.

The diagram 400 depicts an example procedure for writing serialized metadata to a local file that involves serializing and loading sets of serialized metadata into the volatile memory 420 as well as unloading sets of serialized metadata from the volatile memory 420 before the local file 450 is completed. Although diagram 400 depicts a scenario where each set of serialized metadata for a differential group is removed prior to the next set of serialized metadata being loaded, in some examples, multiple sets of metadata for multiple differential groups may be loaded into the volatile memory 420 at a same time. In such cases, the sets of metadata may be written to the local file 450 serially and subsequently removed from the volatile memory 420. In some examples, the sets of metadata may be retained in volatile memory 420 until a threshold utilization of the volatile memory 420 is reached—at which point the written sets of serialized metadata may be removed from the volatile memory 420. Also, the serialized metadata for the sharded group may be removed from the volatile memory 420 at the end of the procedure (e.g., as the Kth operation).

Figure 5:
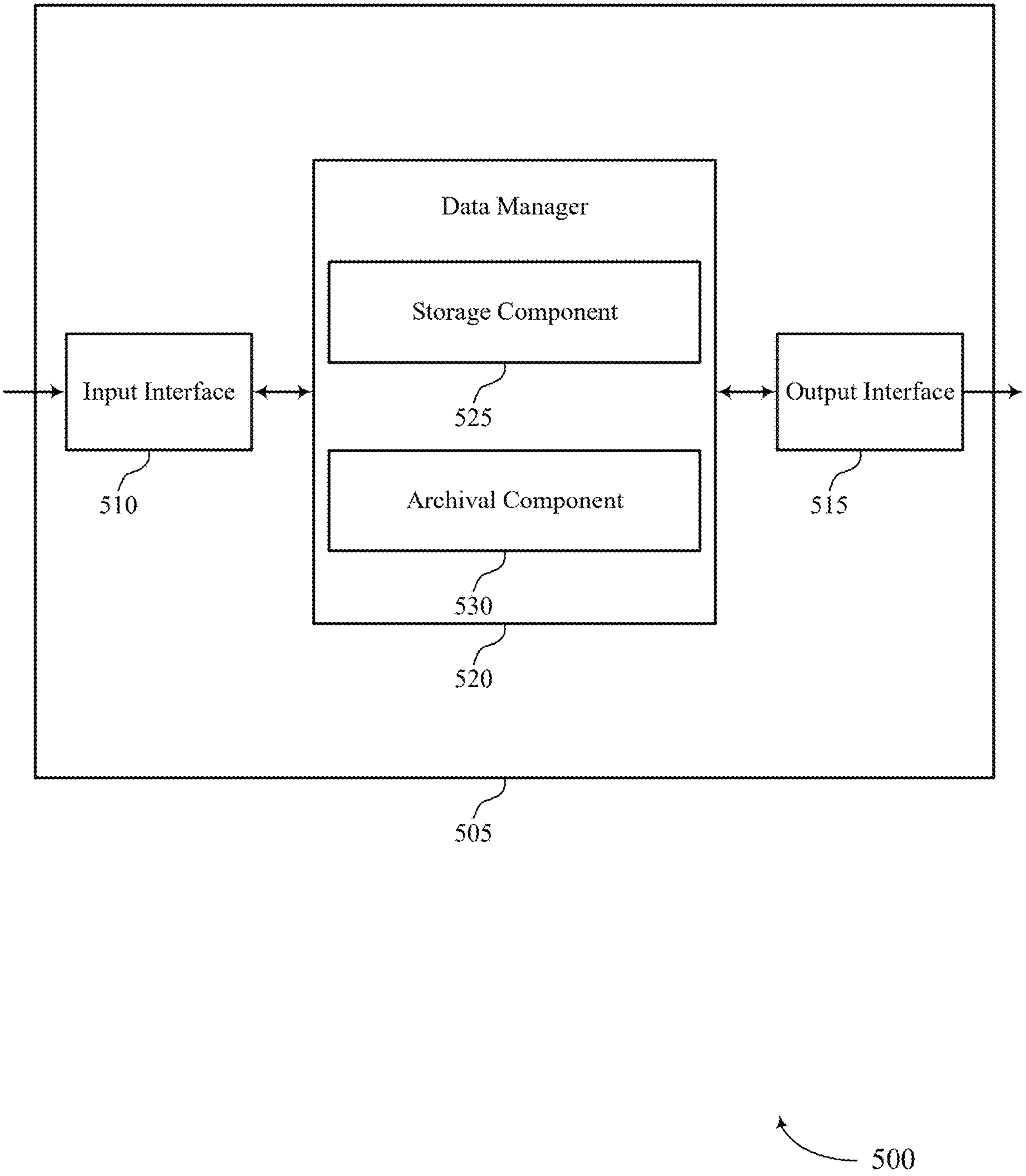
FIG. 5 shows a block diagram of an apparatus that supports appendable data archival in accordance with aspects of the present disclosure.

FIG. 5 shows a block diagram 500 of a system 505 that supports appendable data archival in accordance with aspects of the present disclosure. In some examples, the system 505 may be an example of aspects of one or more components described with reference to FIG. 1, such as a DMS 110. The system 505 may include an input interface 510, an output interface 515, and a data manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the data manager 520 to support appendable data archival. In some cases, the input interface 510 may be a component of a network interface 725 as described with reference to FIG. 7.

The output interface 515 may manage output signaling for the system 505. For example, the output interface 515 may receive signaling from other components of the system 505, such as the data manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the data manager 520 may include a storage component 525 an archival component 530, or any combination thereof. In some examples, the data manager 520, or various components thereof, may be configured to perform various operations (e.g., receiving, monitoring, transmitting) using or otherwise in cooperation with the input interface 510, the output interface 515, or both. For example, the data manager 520 may receive information from the input interface 510, send information to the output interface 515, or be integrated in combination with the input interface 510, the output interface 515, or both to receive information, transmit information, or perform various other operations as described herein.

The storage component 525 may be configured as or otherwise support a means for storing, in nonvolatile memory, versioned metadata associated with a computing object, where the computing object is represented as a portioned group including a set of multiple portions of the computing object, and where the versioned metadata is stored in a first metadata chain for the portioned group and respective metadata chains for respective portions of the set of multiple portions. The archival component 530 may be configured as or otherwise support a means for transferring, to an archival storage system, the versioned metadata for the computing object, where transferring the versioned metadata includes writing serialized metadata in the first metadata chain and the respective metadata chains to a local file, where one metadata chain is written to the local file at a time, and where serialized metadata for a metadata chain is removed from volatile memory before all the versioned metadata has been loaded into the volatile memory, and writing the local file to the archival storage system after all the versioned metadata has been written to the local file.

Figure 6:
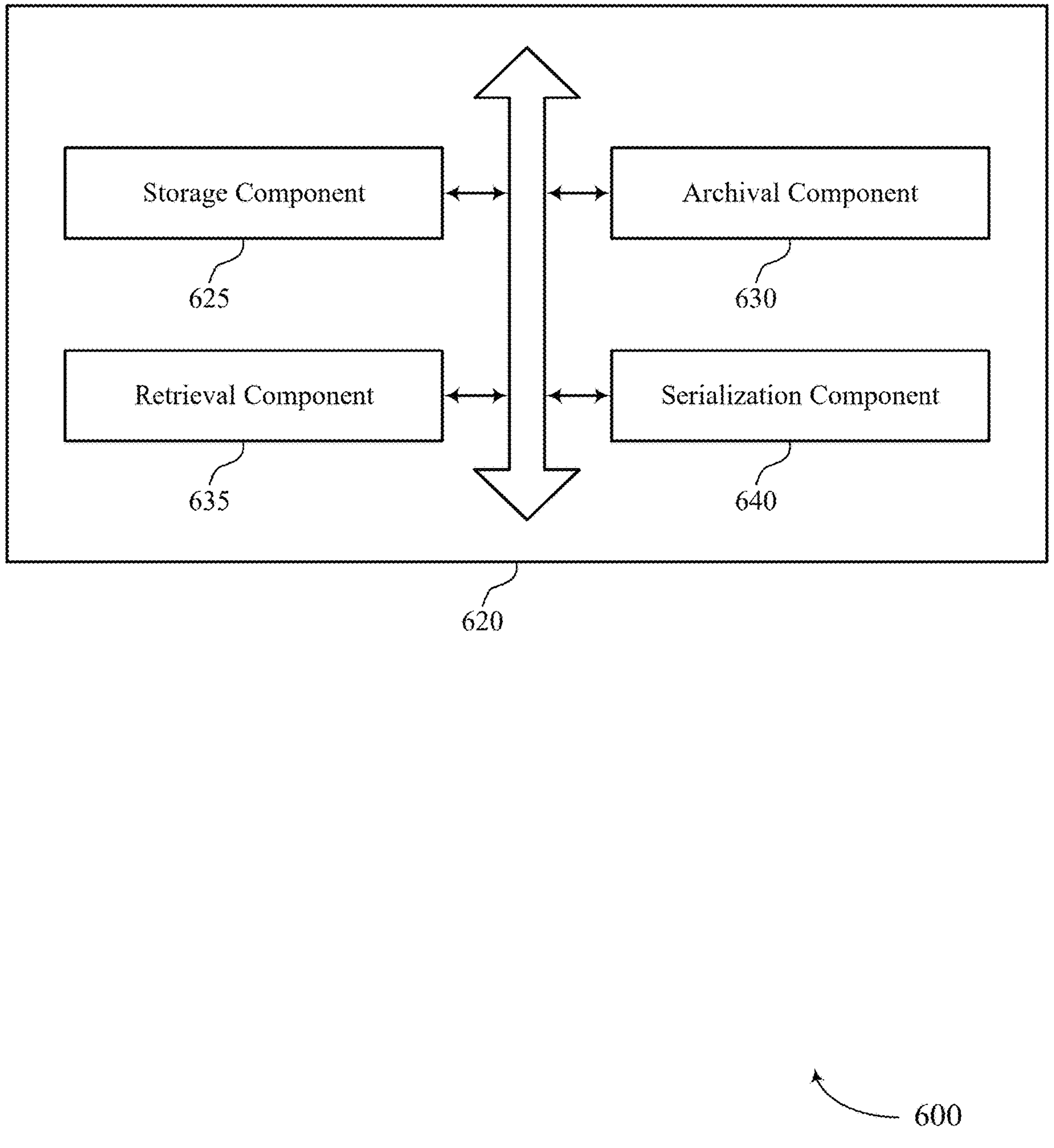
FIG. 6 shows a block diagram of a data manager that supports appendable data archival in accordance with aspects of the present disclosure.

FIG. 6 shows a block diagram 600 of a data manager 620 that supports appendable data archival in accordance with aspects of the present disclosure. The data manager 620 may be an example of aspects of a data manager or a data manager 520, or both, as described herein. The data manager 620, or various components thereof, may be an example of means for performing various aspects of appendable data archival as described herein. For example, the data manager 620 may include a storage component 625, an archival component 630, a retrieval component 635, a serialization component 640, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The storage component 625 may be configured as or otherwise support a means for storing, in nonvolatile memory, versioned metadata associated with a computing object, where the computing object is represented as a portioned group including a set of multiple portions of the computing object, and where the versioned metadata is stored in a first metadata chain for the portioned group and respective metadata chains for respective portions of the set of multiple portions. The archival component 630 may be configured as or otherwise support a means for transferring, to an archival storage system, the versioned metadata for the computing object, where transferring the versioned metadata includes writing serialized metadata in the first metadata chain and the respective metadata chains to a local file, where one metadata chain is written to the local file at a time, and where serialized metadata for a metadata chain is removed from volatile memory before all the versioned metadata has been loaded into the volatile memory, and writing the local file to the archival storage system after all the versioned metadata has been written to the local file.

In some examples, transferring the versioned metadata includes loading the serialized metadata in the first metadata chain for the portioned group into the volatile memory; and loading, after the serialized metadata in the first metadata chain, the respective metadata chains for the respective portions of the set of multiple portions. In some examples, the serialized metadata in the first metadata chain remains in the volatile memory until all the versioned metadata has been loaded into the volatile memory, until all the versioned metadata has been written to the local file, or both.

In some examples, transferring the versioned metadata includes serializing metadata for the first metadata chain to obtain the serialized metadata; writing the serialized metadata to a current end of the local file; and adding, after writing the serialized metadata, a delimiter to the current end of the local file after the serialized metadata.

In some examples, transferring the versioned metadata includes loading metadata for a first metadata chain of the respective metadata chains for the respective portions of the set of multiple portions into the volatile memory; serializing the metadata for the first metadata chain of the respective metadata chains to obtain first serialized metadata; and writing the first serialized metadata to a current end of the local file.

In some examples, transferring the versioned metadata includes adding, after writing the first serialized metadata, a delimiter to the current end of the local file after the first serialized metadata.

In some examples, transferring the versioned metadata includes removing the first serialized metadata from the volatile memory; loading, after at least partially removing the first serialized metadata, metadata for a second metadata chain of the respective metadata chains for the respective portions of the set of multiple portions into the volatile memory; serializing the metadata for the second metadata chain of the respective metadata chains to obtain second serialized metadata; and writing the second serialized metadata to the current end of the local file.

In some examples, transferring the versioned metadata includes adding, after writing the second serialized metadata, a delimiter to the current end of the local file after the second serialized metadata.

In some examples, transferring the versioned metadata includes loading metadata for a first set of multiple metadata chains of the respective metadata chains for the respective portions of the set of multiple portions into the volatile memory; serializing the metadata for the first set of multiple metadata chains of the respective metadata chains to obtain a first set of multiple serialized metadata; and writing the first set of multiple serialized metadata to a current end of the local file one-at-a-time.

In some examples, transferring the versioned metadata includes adding a delimiter to the current end of the local file after each set of serialized metadata of the first set of multiple serialized metadata is written to the local file.

In some examples, transferring the versioned metadata includes removing the first set of multiple serialized metadata from the volatile memory; loading, after at least partially removing the first set of multiple serialized metadata, metadata for a second set of multiple metadata chains of the respective metadata chains for the respective portions of the set of multiple portions into the volatile memory; serializing the metadata for the second set of multiple metadata chains of the respective metadata chains to obtain a second set of multiple serialized metadata; and writing the second set of multiple serialized metadata to the current end of the local file one-at-a-time.

In some examples, the retrieval component 635 may be configured as or otherwise support a means for reading, from the archival storage system, an archived version of the versioned metadata for the computing object, where reading the archived version includes. In some examples, the retrieval component 635 may be configured as or otherwise support a means for determining whether the archived version is stored in accordance with a first format or a second format associated with sets of metadata chains being written to the archived version one-at-a-time. In some examples, the retrieval component 635 may be configured as or otherwise support a means for reading the archived version in accordance with the second format based on determining that the archived version is stored in accordance with the second format.

In some examples, the first format is a JavaScript Object Notation, and the archived version includes a file name indicating that the archived version is stored in accordance with the second format.

In some examples, the storage component 625 may be configured as or otherwise support a means for storing, in the nonvolatile memory, for the respective metadata chains for the respective portions of the set of multiple portions, a serialized string capturing changes that span a set of multiple links in the respective metadata chains.

In some examples, the archival component 630 may be configured as or otherwise support a means for deleting the local file from the computing object.

In some examples, the serialization component 640 may be configured as or otherwise support a means for serializing a set of hierarchical identifiers associated with the respective metadata chains using a string-based format including string-based delimiters.

Figure 7:
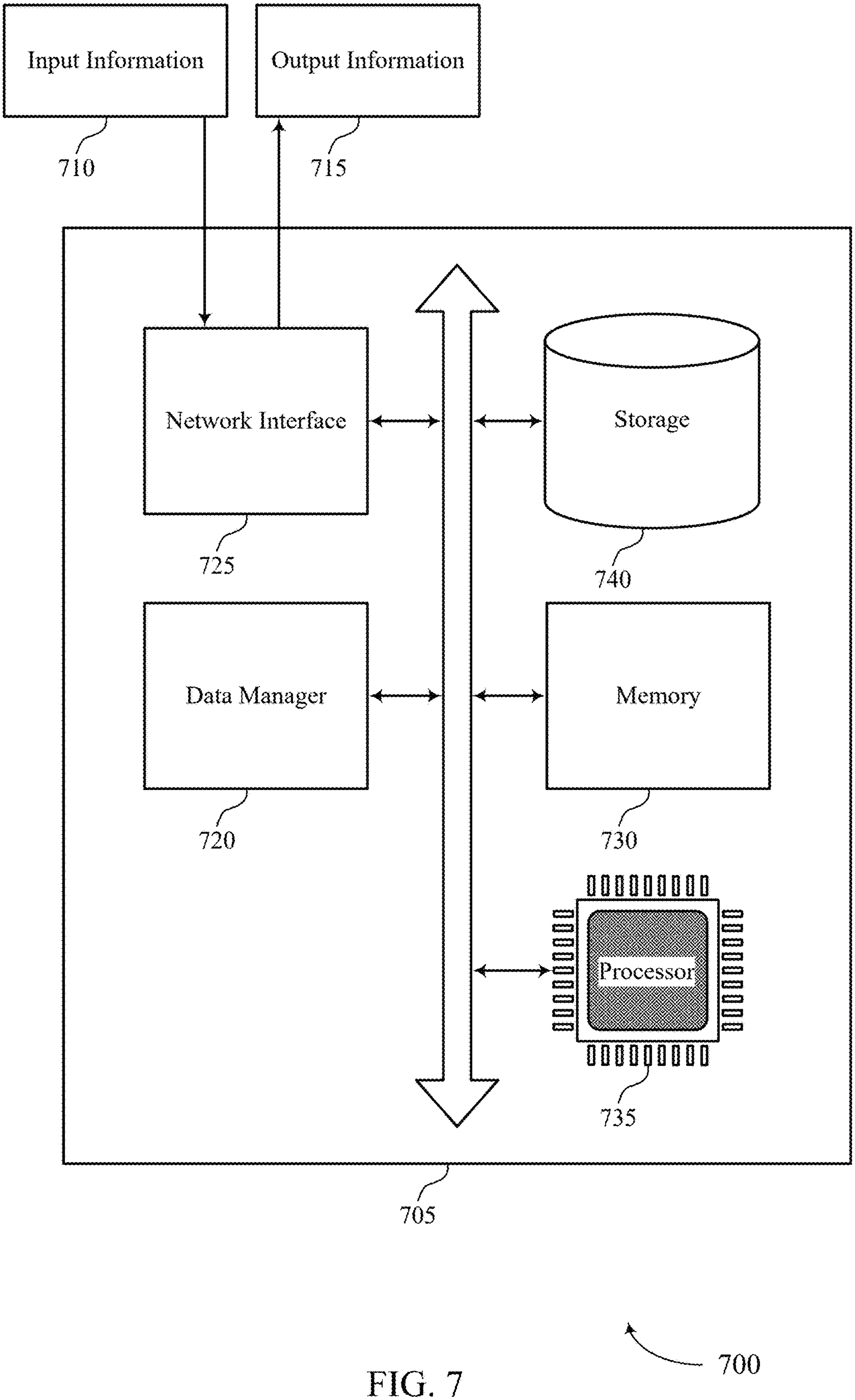
FIG. 7 shows a diagram of a system including a device that supports appendable data archival in accordance with aspects of the present disclosure.

FIG. 7 shows a block diagram 700 of a system 705 that supports appendable data archival in accordance with aspects of the present disclosure. The system 705 may be an example of or include components of a system 505 as described herein. The system 705 may include components for data management, including components such as a data manager 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting appendable data archival). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the data manager 720 may be configured as or otherwise support a means for storing, in nonvolatile memory, versioned metadata associated with a computing object, where the computing object is represented as a portioned group including a set of multiple portions of the computing object, and where the versioned metadata is stored in a first metadata chain for the portioned group and respective metadata chains for respective portions of the set of multiple portions. The data manager 720 may be configured as or otherwise support a means for transferring, to an archival storage system, the versioned metadata for the computing object, where transferring the versioned metadata includes writing serialized metadata in the first metadata chain and the respective metadata chains to a local file, where one metadata chain is written to the local file at a time, and where serialized metadata for a metadata chain is removed from volatile memory before all the versioned metadata has been loaded into the volatile memory, and writing the local file to the archival storage system after all the versioned metadata has been written to the local file.

By including or configuring the data manager 720 in accordance with examples as described herein, the system 705 may support techniques for appendable data archival, which may provide one or more benefits such as, for example, avoiding out-of-memory conditions during data archival (which can lead to data archival failures) and reducing an instantaneous processing load of data archival operations, among other possibilities.

Figure 8:
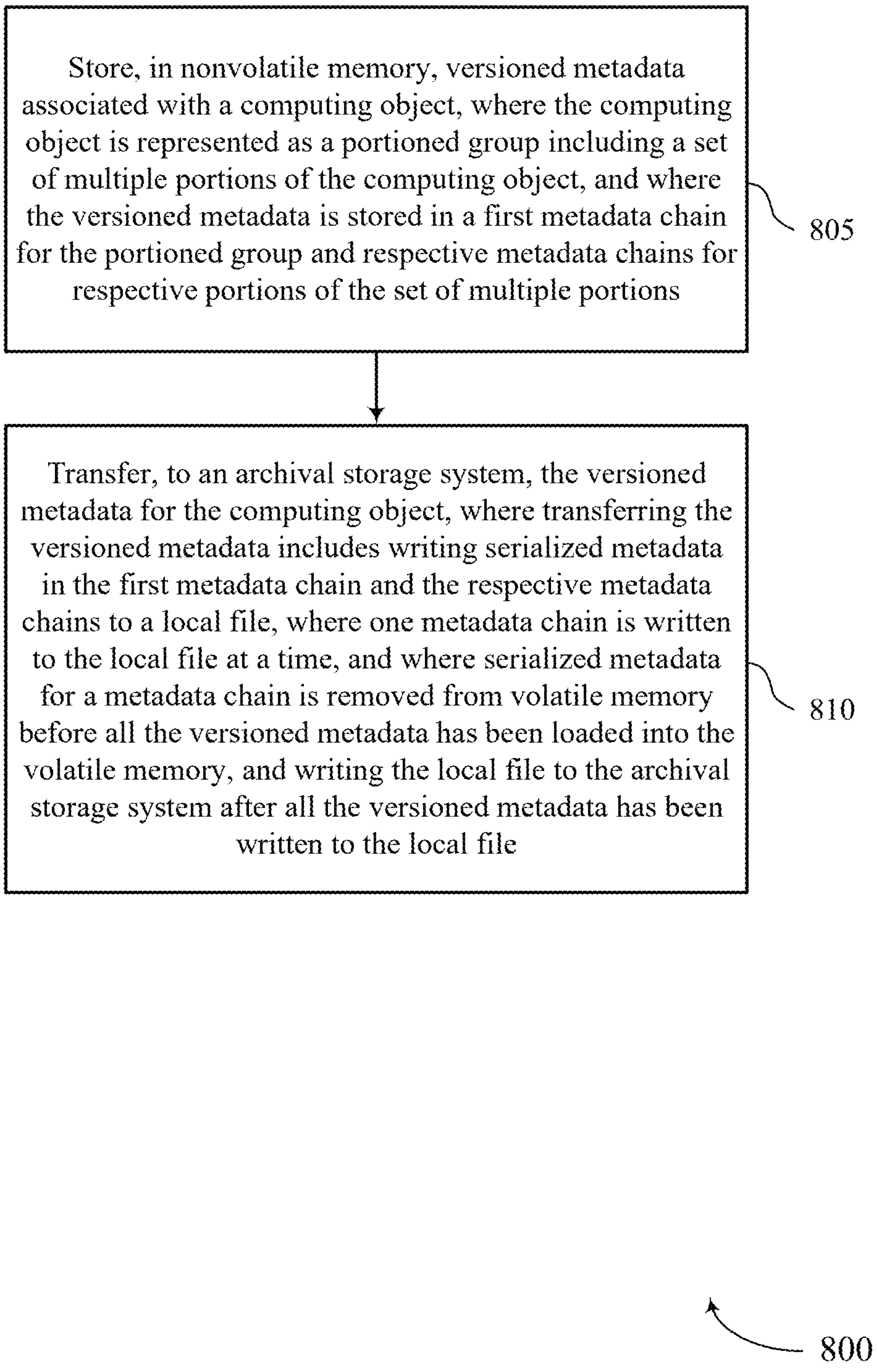
FIG. 8 shows a flowchart illustrating methods that support appendable data archival in accordance with aspects of the present disclosure.

FIG. 8 shows a flowchart illustrating a method 800 that supports appendable data archival in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include storing, in nonvolatile memory, versioned metadata associated with a computing object, where the computing object is represented as a portioned group including a set of multiple portions of the computing object, and where the versioned metadata is stored in a first metadata chain for the portioned group and respective metadata chains for respective portions of the set of multiple portions. The operations of 805 may be performed in accordance with examples as disclosed herein. In some examples, aspects of the operations of 805 may be performed by a storage component 625 as described with reference to FIG. 6.

At 810, the method may include transferring, to an archival storage system, the versioned metadata for the computing object, where transferring the versioned metadata includes writing serialized metadata in the first metadata chain and the respective metadata chains to a local file, where one metadata chain is written to the local file at a time, and where serialized metadata for a metadata chain is removed from volatile memory before all the versioned metadata has been loaded into the volatile memory, and writing the local file to the archival storage system after all the versioned metadata has been written to the local file. The operations of 810 may be performed in accordance with examples as disclosed herein. In some examples, aspects of the operations of 810 may be performed by an archival component 630 as described with reference to FIG. 6.

The following provides an overview of aspects of the present disclosure:

Aspect 1: A method, comprising: storing, in nonvolatile memory, versioned metadata associated with a computing object, wherein the computing object is represented as a portioned group comprising a plurality of portions of the computing object, and wherein the versioned metadata is stored in a first metadata chain for the portioned group and respective metadata chains for respective portions of the plurality of portions; and transferring, to an archival storage system, the versioned metadata for the computing object, wherein transferring the versioned metadata comprises writing serialized metadata in the first metadata chain and the respective metadata chains to a local file, wherein one metadata chain is written to the local file at a time, and wherein serialized metadata for a metadata chain is removed from volatile memory before all the versioned metadata has been loaded into the volatile memory, and writing the local file to the archival storage system after all the versioned metadata has been written to the local file.

Aspect 2: The method of aspect 1, wherein transferring the versioned metadata comprises loading the serialized metadata in the first metadata chain for the portioned group into the volatile memory; and loading, after the serialized metadata in the first metadata chain, the respective metadata chains for the respective portions of the plurality of portions, the serialized metadata in the first metadata chain remains in the volatile memory until all the versioned metadata has been loaded into the volatile memory, until all the versioned metadata has been written to the local file, or both.

Aspect 3: The method of aspect 2, wherein transferring the versioned metadata comprises serializing metadata for the first metadata chain to obtain the serialized metadata; writing the serialized metadata to a current end of the local file; and adding, after writing the serialized metadata, a delimiter to the current end of the local file after the serialized metadata.

Aspect 4: The method of any of aspects 1 through 3, wherein transferring the versioned metadata comprises loading metadata for a first metadata chain of the respective metadata chains for the respective portions of the plurality of portions into the volatile memory; serializing the metadata for the first metadata chain of the respective metadata chains to obtain first serialized metadata; and writing the first serialized metadata to a current end of the local file.

Aspect 5: The method of aspect 4, wherein transferring the versioned metadata comprises adding, after writing the first serialized metadata, a delimiter to the current end of the local file after the first serialized metadata.

Aspect 6: The method of any of aspects 4 through 5, wherein transferring the versioned metadata comprises removing the first serialized metadata from the volatile memory; loading, after at least partially removing the first serialized metadata, metadata for a second metadata chain of the respective metadata chains for the respective portions of the plurality of portions into the volatile memory; serializing the metadata for the second metadata chain of the respective metadata chains to obtain second serialized metadata; and writing the second serialized metadata to the current end of the local file.

Aspect 7: The method of aspect 6, wherein transferring the versioned metadata comprises adding, after writing the second serialized metadata, a delimiter to the current end of the local file after the second serialized metadata.

Aspect 8: The method of any of aspects 1 through 7, wherein transferring the versioned metadata comprises loading metadata for a first plurality of metadata chains of the respective metadata chains for the respective portions of the plurality of portions into the volatile memory; serializing the metadata for the first plurality of metadata chains of the respective metadata chains to obtain a first plurality of serialized metadata; and writing the first plurality of serialized metadata to a current end of the local file one-at-a-time.

Aspect 9: The method of aspect 8, wherein transferring the versioned metadata comprises adding a delimiter to the current end of the local file after each set of serialized metadata of the first plurality of serialized metadata is written to the local file.

Aspect 10: The method of any of aspects 8 through 9, wherein transferring the versioned metadata comprises removing the first plurality of serialized metadata from the volatile memory; loading, after at least partially removing the first plurality of serialized metadata, metadata for a second plurality of metadata chains of the respective metadata chains for the respective portions of the plurality of portions into the volatile memory; serializing the metadata for the second plurality of metadata chains of the respective metadata chains to obtain a second plurality of serialized metadata; and writing the second plurality of serialized metadata to the current end of the local file one-at-a-time.

Aspect 11: The method of any of aspects 1 through 10, further comprising: reading, from the archival storage system, an archived version of the versioned metadata for the computing object, wherein reading the archived version comprises: determining whether the archived version is stored in accordance with a first format or a second format associated with sets of metadata chains being written to the archived version one-at-a-time; and reading the archived version in accordance with the second format based at least in part on determining that the archived version is stored in accordance with the second format.

Aspect 12: The method of aspect 11, wherein the first format is a JavaScript Object Notation, and the archived version comprises a file name indicating that the archived version is stored in accordance with the second format.

Aspect 13: The method of any of aspects 1 through 12, further comprising: storing, in the nonvolatile memory, for the respective metadata chains for the respective portions of the plurality of portions, a serialized string capturing changes that span a plurality of links in the respective metadata chains.

Aspect 14: The method of any of aspects 1 through 13, further comprising: deleting the local file from the computing object.

Aspect 15: The method of any of aspects 1 through 14, further comprising: serializing a set of hierarchical identifiers associated with the respective metadata chains using a string-based format comprising string-based delimiters.

Aspect 16: An apparatus comprising one or more memories storing processor-executable code, and one or more processors coupled with the one or more memories and individually or collectively operable to execute the code to cause the apparatus to perform a method of any of aspects 1 through 15.

Aspect 17: An apparatus comprising at least one means for performing a method of any of aspects 1 through 15.

Aspect 18: A non-transitory computer-readable medium storing code the code comprising instructions executable by one or more processors to perform a method of any of aspects 1 through 15.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article “a” before a noun is open-ended and understood to refer to “at least one” of those nouns or “one or more” of those nouns. Thus, the terms “a,” “at least one,” “one or more,” and “at least one of one or more” may be interchangeable. For example, if a claim recites “a component” that performs one or more functions, each of the individual functions may be performed by a single component or by any combination of multiple components. Thus, “a component” having characteristics or performing functions may refer to “at least one of one or more components” having a particular characteristic or performing a particular function. Subsequent reference to a component introduced with the article “a” using the terms “the” or “said” refers to any or all of the one or more components. For example, a component introduced with the article “a” shall be understood to mean “one or more components,” and referring to “the component” subsequently in the claims shall be understood to be equivalent to referring to “at least one of the one or more components.”

Also, as used herein, including in the claims, “or” as used in a list of items (for example, a list of items prefaced by a phrase such as “at least one of” or “one or more of”) indicates an inclusive list such that, for example, a list of at least one of A, B, or C means A or B or C or AB or AC or BC or ABC (i.e., A and B and C). Also, as used herein, the phrase “based on” shall not be construed as a reference to a closed set of conditions. For example, an exemplary step that is described as “based on condition A” may be based on both a condition A and a condition B without departing from the scope of the present disclosure. In other words, as used herein, the phrase “based on” shall be construed in the same manner as the phrase “based at least in part on.”

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

storing, in nonvolatile memory, versioned metadata associated with a computing object, wherein the computing object is represented as a portioned group comprising a plurality of portions of the computing object, wherein a first portion of the versioned metadata is stored in a first metadata chain for the portioned group that tracks metadata changes associated with the portioned group, and wherein additional portions of the versioned metadata are stored in respective metadata chains that store metadata associated with a respective group and track metadata changes associated with the respective group; and transferring, to an archival storage system, the versioned metadata for the computing object, wherein transferring the versioned metadata comprises:

writing serialized metadata in the first metadata chain and the respective metadata chains to a local file, wherein each metadata chain is written to the local file one at a time, and wherein serialized metadata for a metadata chain is at least partially removed from volatile memory before a subsequent metadata chain is written to the local file and before all the versioned metadata has been loaded into the volatile memory, and writing the local file to the archival storage system after all the versioned metadata has been written to the local file.

2. The method of claim 1, wherein transferring the versioned metadata comprises:

loading the serialized metadata in the first metadata chain for the portioned group into the volatile memory; and loading, after the serialized metadata in the first metadata chain, the respective metadata chains for the respective portions of the plurality of portions, wherein the serialized metadata in the first metadata chain remains in the volatile memory until all the versioned metadata has been loaded into the volatile memory, until all the versioned metadata has been written to the local file, or both.

3. The method of claim 2, wherein transferring the versioned metadata comprises:

serializing metadata for the first metadata chain for the portioned group to obtain the serialized metadata;

writing the serialized metadata to a current end of the local file; and adding, after writing the serialized metadata, a delimiter to the current end of the local file after the serialized metadata.

4. The method of claim 1, wherein transferring the versioned metadata comprises:

loading metadata for the first metadata chain of the respective metadata chains for the respective portions of the plurality of portions into the volatile memory;

serializing the metadata for the first metadata chain of the respective metadata chains to obtain first serialized metadata; and writing the first serialized metadata to a current end of the local file.

5. The method of claim 4, wherein transferring the versioned metadata comprises:

adding, after writing the first serialized metadata, a delimiter to the current end of the local file after the first serialized metadata.

6. The method of claim 4, wherein transferring the versioned metadata comprises:

removing the first serialized metadata from the volatile memory;

loading, after at least partially removing the first serialized metadata, metadata for a second metadata chain of the respective metadata chains for the respective portions of the plurality of portions into the volatile memory;

serializing the metadata for the second metadata chain of the respective metadata chains to obtain second serialized metadata; and writing the second serialized metadata to the current end of the local file.

7. The method of claim 6, wherein transferring the versioned metadata comprises:

adding, after writing the second serialized metadata, a delimiter to the current end of the local file after the second serialized metadata.

8. The method of claim 1, wherein transferring the versioned metadata comprises:

loading metadata for a first plurality of metadata chains of the respective metadata chains for the respective portions of the plurality of portions into the volatile memory;

serializing the metadata for the first plurality of metadata chains of the respective metadata chains to obtain a first plurality of serialized metadata; and writing the first plurality of serialized metadata to a current end of the local file one-at-a-time.

9. The method of claim 8, wherein transferring the versioned metadata comprises:

adding a delimiter to the current end of the local file after each set of serialized metadata of the first plurality of serialized metadata is written to the local file.

10. The method of claim 8, wherein transferring the versioned metadata comprises:

removing the first plurality of serialized metadata from the volatile memory;

loading, after at least partially removing the first plurality of serialized metadata, metadata for a second plurality of metadata chains of the respective metadata chains for the respective portions of the plurality of portions into the volatile memory;

serializing the metadata for the second plurality of metadata chains of the respective metadata chains to obtain a second plurality of serialized metadata; and writing the second plurality of serialized metadata to the current end of the local file one-at-a-time.

11. The method of claim 1, further comprising:

reading, from the archival storage system, an archived version of the versioned metadata for the computing object, wherein reading the archived version comprises:

determining whether the archived version is stored in accordance with a first format or a second format associated with sets of metadata chains being written to the archived version one-at-a-time; and reading the archived version in accordance with the second format based at least in part on determining that the archived version is stored in accordance with the second format.

12. The method of claim 11, wherein:

the first format is a JavaScript Object Notation, and the archived version comprises a file name indicating that the archived version is stored in accordance with the second format.

13. The method of claim 1, further comprising:

storing, in the nonvolatile memory, for the respective metadata chains for the respective portions of the plurality of portions, a serialized string capturing changes that span a plurality of links in the respective metadata chains.

14. The method of claim 1, further comprising:

deleting the local file from the computing object.

15. The method of claim 1, further comprising:

serializing a set of hierarchical identifiers associated with the respective metadata chains using a string-based format comprising string-based delimiters.

16. A data management system, comprising:

one or more memories; and one or more processors, wherein the one or more memories store code comprising instructions executable, individually or collectively, by the one or more processors to cause the data management system to:

store, in nonvolatile memory, versioned metadata associated with a computing object, wherein the computing object is represented as a portioned group comprising a plurality of portions of the computing object, wherein a first portion of the versioned metadata is stored in a first metadata chain for the portioned group that tracks metadata changes associated with the portioned group, and wherein additional portions of the versioned metadata are stored in respective metadata chains that store metadata associated with a respective group and track metadata changes associated with the respective group; and transfer, to an archival storage system, the versioned metadata for the computing object, wherein the instructions for transferring the versioned metadata are executable by the one or more processors to cause the data management system to:

write serialized metadata in the first metadata chain and the respective metadata chains to a local file, wherein each metadata chain is written to the local file one at a time, and wherein serialized metadata for a metadata chain is at least partially removed from volatile memory before a subsequent metadata chain is written to the local file and before all the versioned metadata has been loaded into the volatile memory, and write the local file to the archival storage system after all the versioned metadata has been written to the local file.

17. The data management system of claim 16, wherein the instructions for transferring the versioned metadata is further executable by the one or more processors to cause the data management system to:

load the serialized metadata in the first metadata chain for the portioned group into the volatile memory; and load, after the serialized metadata in the first metadata chain, the respective metadata chains for the respective portions of the plurality of portions, wherein the serialized metadata in the first metadata chain remains in the volatile memory until all the versioned metadata has been loaded into the volatile memory, until all the versioned metadata has been written to the local file, or both.

18. The data management system of claim 16, wherein the instructions for transferring the versioned metadata is further executable by the one or more processors to cause the data management system to:

load metadata for the first metadata chain of the respective metadata chains for the respective portions of the plurality of portions into the volatile memory;

serialize the metadata for the first metadata chain of the respective metadata chains to obtain first serialized metadata; and write the first serialized metadata to a current end of the local file.

19. The data management system of claim 16, wherein the instructions for transferring the versioned metadata is further executable by the one or more processors to cause the data management system to:

load metadata for a first plurality of metadata chains of the respective metadata chains for the respective portions of the plurality of portions into the volatile memory;

serialize the metadata for the first plurality of metadata chains of the respective metadata chains to obtain a first plurality of serialized metadata; and write the first plurality of serialized metadata to a current end of the local file one-at-a-time.

20. A non-transitory, computer-readable medium storing code that comprises instructions that are executable, individually or collectively, by one or more processors of a data management system to cause the data management system to:

store, in nonvolatile memory, versioned metadata associated with a computing object, wherein the computing object is represented as a portioned group comprising a plurality of portions of the computing object, respective metadata chains for respective portions of the plurality of portions wherein a first portion of the versioned metadata is stored in a first metadata chain for the portioned group that tracks metadata changes associated with the portioned group, and wherein additional portions of the versioned metadata are stored in respective metadata chains that store metadata associated with a respective group and track metadata changes associated with the respective group; and transfer, to an archival storage system, the versioned metadata for the computing object, wherein the instructions for transferring the versioned metadata are executable by the one or more processors to cause the data management system to:

write serialized metadata in the first metadata chain and the respective metadata chains to a local file, wherein each metadata chain is written to the local file one at a time, and wherein serialized metadata for a metadata chain is at least partially removed from volatile memory before a subsequent metadata chain is written to the local file and before all the versioned metadata has been loaded into the volatile memory, and write the local file to the archival storage system after all the versioned metadata has been written to the local file.

* * * * *